United States Patent [19]
Cobb et al.

[11] Patent Number: 5,926,311
[45] Date of Patent: *Jul. 20, 1999

[54] ILLUMINATION/VIEWING SYSTEM FOR FEATURES IN TRANSPARENT MATERIALS

[75] Inventors: Joshua Monroe Cobb, Victor; Robert Francis Florence, Jr., Poughkeepsie; Franz X. Topolovec, Accord; Uldis Artis Ziemins, Poughkeepsie, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/808,928

[22] Filed: Feb. 28, 1997

[51] Int. Cl.⁶ .................................................. G02B 21/06
[52] U.S. Cl. ......................... 359/385; 359/386; 359/387
[58] Field of Search ........................... 359/363, 368–390; 356/239.1–239.8, 244, 246, 128, 435, 369

[56] References Cited

U.S. PATENT DOCUMENTS

| | | | |
|---|---|---|---|
| 2,944,463 | 7/1960 | Rantsch | 359/386 |
| 4,440,475 | 4/1984 | Colliaux | 359/387 |
| 4,523,849 | 6/1985 | Stone | 356/369 |
| 4,906,083 | 3/1990 | Sattler | 359/386 |
| 5,035,476 | 7/1991 | Ellis et al. | 359/368 |

OTHER PUBLICATIONS

"Fundamentals of Optics" by Jenkins & White McGraw–Hill, 1976, pp. 602–603.

*Primary Examiner*—Thong Nguyen
*Attorney, Agent, or Firm*—Ratner & Prestia

[57] ABSTRACT

Method and apparatus for illuminating a transparent material for identifying individual features in the material having similar refractive indices, without using a phase-contrast microscope, by illuminating the material by light directed at an angle to a reflective surface which directs the light through the material to a viewing device such as a microscope.

10 Claims, 1 Drawing Sheet

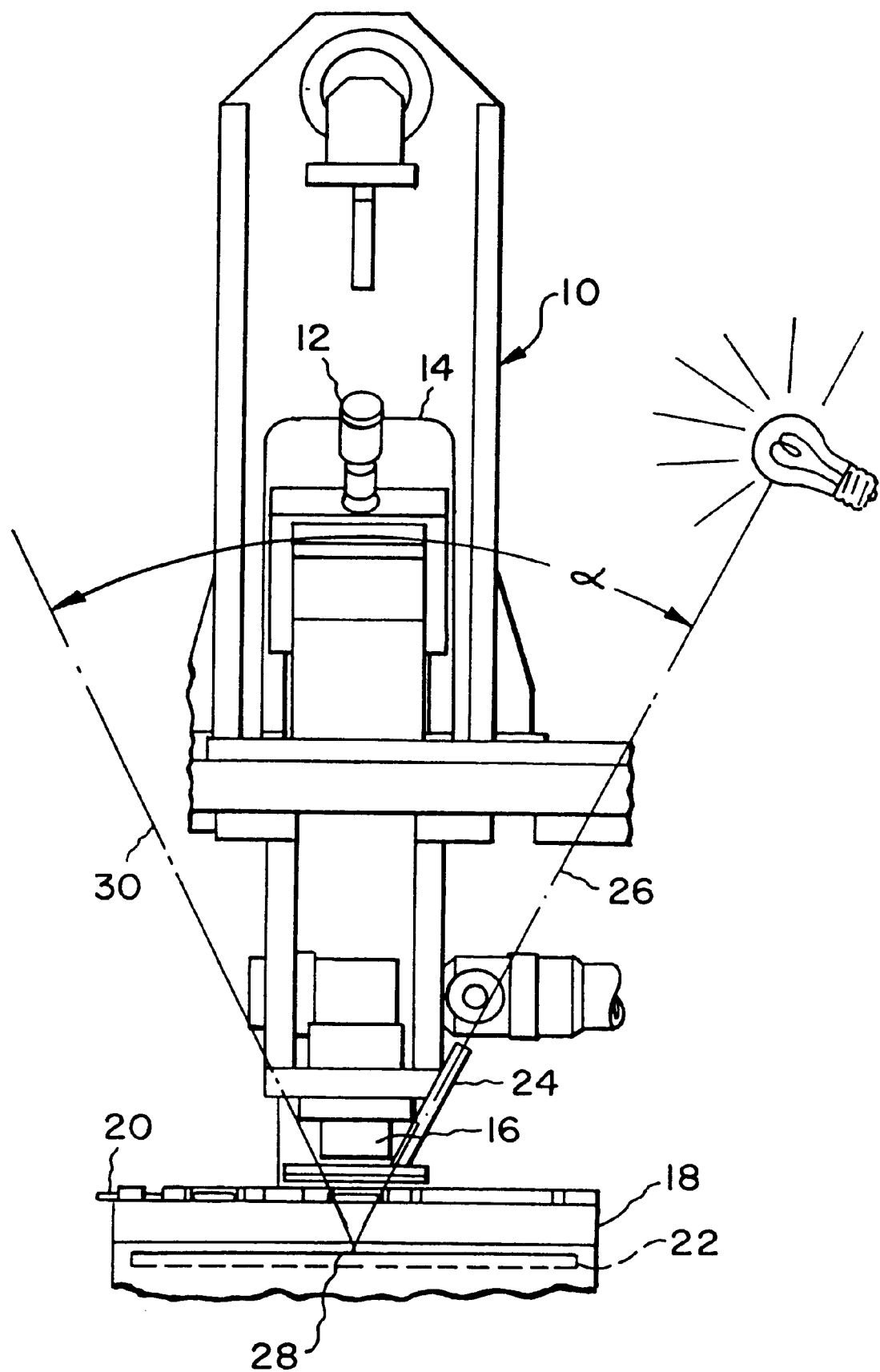

ILLUMINATION/VIEWING SYSTEM FOR FEATURES IN TRANSPARENT MATERIALS

FIELD OF THE INVENTION

This invention relates to microscopic examination of transparent materials having micro size features with similar refractive indices.

BACKGROUND OF THE INVENTION

Conventional microscopes utilizing vertically reflected illumination can not be used to distinguish micron size features in transparent materials where the features have very similar refractive indices. Thus, in order to view features in transparent materials where the features have very similar refractive indices it has been necessary to employ a phase-contrast microscope. A typical phase-contrast microscope is described in section 28.13 of Fundamentals of Optics by Jenkins & White published by McGraw-Hill (1976).

For instance, in the manufacture of wave guides for telecommunication applications, there are features in the wave guides that must be observed so that operations such as laser cutting of inputs and outputs for the wave guides can be completed. In order to position the wave guide for laser cutting it would be necessary to use a phase-contrast microscope to determine the precise cutting regime for the laser. Incorporation of a phase-contrast microscope into a system that determines the cutting regime by using a machine vision system would be cumbersome and result in processing inefficiencies.

Therefore, it is desirable to find alternatives to the phase-contrast microscope when trying to distinguish features having similar refractive indices in a transparent material.

BRIEF SUMMARY OF THE INVENTION

It has been discovered that positioning a light source at an acute angle to an axis perpendicular to a transparent work piece and a reflecting device (e.g., a mirror), where the longitudinal axis of an objective lens of a microscope is positioned on the axis so that the light is reflected by the mirror to illuminate the work piece, permits microscope viewing of features of the work piece that have similar refractive indices. A fiber optic bundle positioned to direct light at a mirror disposed underneath the work piece so that the light is reflected through the back of the work piece to illuminate the features for viewing by the objective lens of the microscope achieves the desired result. Alternatively, more than one fiber optic bundle can be used with multiplexing or shuttering of unwanted bundles to provide correct lighting for the features sought to be viewed. By varying the angle and position of the fiber bundle, the refraction caused by the features can be effected as bright or dark contrast. A machine vision system can view the features identified by the microscope to position the work piece for subsequent processing operations such as laser cutting.

BRIEF DESCRIPTION OF THE DRAWING

The single FIGURE of the drawing is a front elevational fragmentary view of a system employing an apparatus according to the present invention.

DETAILED DESCRIPTION OF THE INVENTION

Referring to the drawing, numeral 10 indicates a fixture for supporting, among other elements, a microscope eye piece 12, a camera or machine vision system 14, an objective lens 16, a microscope stage or specimen support 18, a specimen 20 and a reflective device or mirror 22. The fixture 10 is adapted so that, not only can the specimen 20 be viewed, but other operations (e.g., laser cutting) can be performed on the specimen 20 by manipulating the support 18. The support 18 can be moved in three mutually perpendicular directions (commonly referred to as X, Y, Z) as is known in the art.

According to the present invention, a fiber optic bundle 24 is disposed adjacent the objective lens 16, so that light from a source 40 is directed as shown by the line 26 to a point 28 on the surface of the mirror 22 which is directly below and perpendicular to the face of-the objective lens 16. Line 30 shows the general path of the reflected light; lines 26 and 30 make an angle ($\alpha$).

The method and apparatus of the present invention can be used to view micron size features in a transparent specimen which resides in a transparent background, where the specimen and background have similar refractive indices. In particular, the method and apparatus can be used to distinguish features in optical wave guides so that further operations, such as laser cutting, can be effected on the optical wave guide.

One particular system according to the invention uses an achromatic objective lens 16, with the fiber optic bundle 24 positioned so that the angle $\alpha$ is 50 degrees. The light is directed outside the field of view through the transparent specimen 20 and reflected from the first surface of the mirror 22, located just beneath the transparent specimen 20, and directed onto the specimen feature of interest from the backside of the transparent specimen. The identified feature of interest is imaged with the objective lens 16 and relay optics into the camera 14. The information transmitted to the camera 14 is then used to position a servo stage for accomplishing the desired laser operations on the specimen 20.

The angle $\alpha$ can be optimized for different specimens in order to provide a sharp contrast between the transparent features and the transparent specimen. Various illumination angles and positions were tested to ascertain the highest contrast possible. Thus, the angle a can vary between 35 and 85 degrees in order to effect the results of the present invention.

The use of indirect lighting is required because direct lighting of the specimen when viewing transparent materials results in either a saturated image or no contrast between the feature and the specimen.

It is also possible to position fiber optic bundles 24 around the circumference of the objective lens 16 or at fixed intermediate positions (e.g., 90 degrees apart). The fiber optic bundles 24 can be positioned at locations axial to the features and then reversed for perpendicular feature viewing. It is also possible to multiplex or shutter unwanted or unneeded fiber optic bundles 24 to provide the correct lighting, which depends upon the position of the feature in the specimen.

Thus, the off-axis illumination of the present invention provides light reflected from the first surface of the mirror 22 angularly onto the feature. Depending upon the angular disposition of the fiber optic bundle 24, it is possible to provide bright or dark contrast of the feature being observed relative to the specimen. It is believed that the refraction of the light in the material caused by the lighting system directs the necessary rays of light into the entrance pupil of the objective lens 16. By controlling the angular position of the fiber optic bundle 24, refraction is used to obtain bright or dark contrast of the transparent features.

Once the features have been identified, a machine vision system can be used to map the features and to prepare the specimen for positioning by the support 18 for laser cutting.

A system to view transparent features with similar refractive indices in polymer wave guides was constructed according to the present invention. A conventional microscope with a 0.35 numerical aperture achromatic objective lens was modified to incorporate a lighting system as described above. The system was incorporated with a laser system for preparing inputs and outputs on the wave guides by identifying features in the six micron size range. The information obtained by viewing with the microscope was incorporated with a machine view system which, in turn, positioned the wave guide and laser relative to one another for further processing of the wave guide.

Although illustrated and described herein with reference to certain specific embodiments, the present invention is nevertheless not intended to be limited to the details shown. Further, various modifications may be made in the details within the scope of the invention as defined in the following claims.

What is claimed:

1. A system for illuminating a transparent material to identify features in the transparent material having similar refractive indices, comprising in combination:

a mirror disposed beneath and proximate to said material, said material and said mirror positioned perpendicular to an axis perpendicular to a face of an objective lens used to view features in said material; and light source positioned at an acute angle to said axis to direct light at said mirror to, by reflection from said mirror, illuminate an area of said material to be viewed, said light being directed outside a field of view of said objective lens through the transparent material to said mirror, said light entering said transparent material at an acute angle on a surface of said material positioned facing said objective lens, and reflected back through said transparent material at an acute angle to said axis whereby said transparent material is indirectly illuminated for viewing.

2. A system according to claim 1 wherein said means to direct light is a fiber optic bundle.

3. A system according to claim 1 further comprising a vision system positioned to view said illuminated material.

4. A system according to claim 1 further comprising an optical viewing system for viewing features in said material.

5. A system according to claim 4 wherein said optical viewing system includes said objective lens disposed proximate said material, said objective lens providing an image for viewing through an eye piece.

6. A system according to claim 5 further comprising means to position a support holding said material for a subsequent manufacturing operation, the position of the support holding said material in the subsequent manufacturing operation is determined according to observations on said illuminated material by a machine viewing system incorporated into said viewing system and adapted to transmit positioning information to said manufacturing operation.

7. A method for identifying features having similar refractive indices in a transparent material comprising the steps of:

supporting said material for viewing by light directed at a mirror disposed beneath said transparent material; and creating reflected light by directing a source of light at an acute angle to said mirror disposed beneath said material, said angle determined relative to a longitudinal axis of a viewing device which is positioned generally perpendicular to said material and said mirror, said source of light positioned to direct light outside a field of view through the transparent material to said mirror and from said mirror through said transparent material outside the field of view at an acute angle whereby said transparent material is illuminated and a selected feature can be viewed.

8. A method according to claim 7 further comprising disposing a mirror beneath said material to direct said reflected light.

9. A method according to claim 7 further comprising the step of supporting said material on a surface movable in three directions, said directions perpendicular to one another.

10. A method according to claim 7 further comprising the step of installing at least one fiber optic bundle to direct light to said reflective surface.

\* \* \* \* \*

UNITED STATES PATENT AND TRADE MARK OFFICE
CERTIFICATE OF CORRECTION

PATENT NO. : 5,926,311
DATED : July 20, 1999
INVENTORS : Joshua M. Cobb et al.

It is certified that error appears in the above-identified patent and that said Letters Patent is hereby corrected as shown below:

On the title page, item:

[56] References Cited
   U.S. PATENT DOCUMENTS

| | | | | |
|---|---|---|---|---|
| 5,126,877 | 06/1992 | Biber | 359 | 385 |
| 5,249,077 | 09/1993 | Laronga et al. | 359 | 385 |
| 4,690,521 | 09/1987 | Sacomanno | 359 | 385 |
| 4,813,588 | 03/1989 | Srivastava et al. | 359 | 385 |
| 4,209,226 | 06/1980 | Wardlaw et al. | 359 | 388 |
| 3,650,597 | 03/1972 | Nothnagle | 359 | 385 |

In Column 3, claim 1, line 30, insert —a— before "light source"

Signed and Sealed this

Eighth Day of August, 2000

Attest:

Q. TODD DICKINSON

*Attesting Officer*          *Director of Patents and Trademarks*